Figure 1:
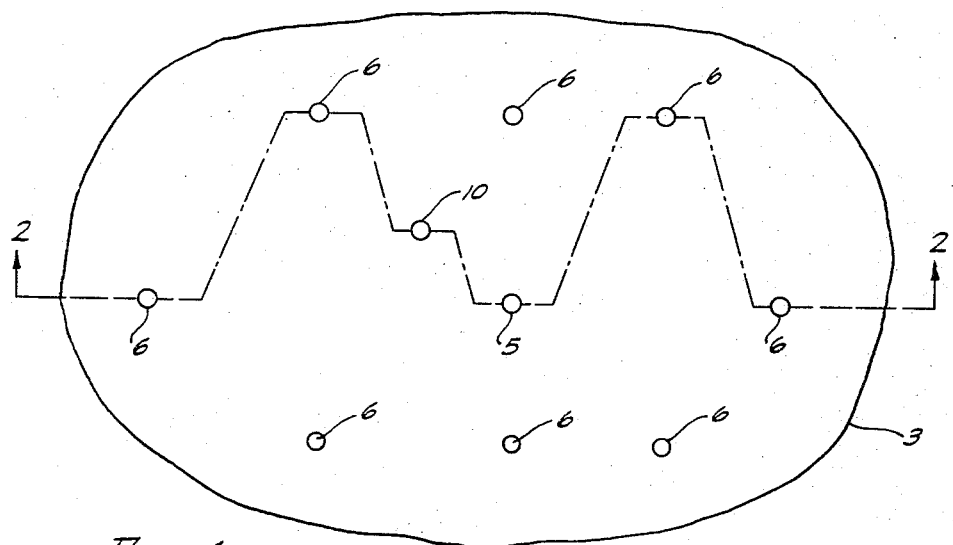

July 11, 1967 — G. G. BERNARD — 3,330,352
METHOD FOR THE SUBTERRANEAN STORAGE OF GAS
Filed Nov. 2, 1966

INVENTOR.
GEORGE G. BERNARD
BY
ATTORNEY

United States Patent Office 3,330,352
Patented July 11, 1967

3,330,352
METHOD FOR THE SUBTERRANEAN STORAGE OF GAS
George G. Bernard, Fullerton, Calif., assignor to Union Oil Company of California, Los Angeles, Calif., a corporation of California
Filed Nov. 2, 1966, Ser. No. 591,483
30 Claims. (Cl. 166—30)

This application is a continuation-in-part of application Ser. No. 294,755, filed July 12, 1963, now abandoned.

This invention relates to a method for storing gas in natural porous subterranean formations and is more particularly concerned with a method for increasing the gas storage capacity of subterranean water-containing porous rock formations and for confining injected gas within a desired section of the formation.

It is well known to store natural and other gases in subterranean formations by injecting the gas under pressure into a well drilled into the formation. The amount of gas which can be stored will depend on a number of factors, such as the pressure under which it is injected, the permeability of the formation into which the gas is injected, and the amount of interstitial water and/or hydrocarbons retained in the formation. Suitable formations in which to store gas are mobile water-bearing, porous rock formations having a substantially impervious rock cap which seals the formation and prevents loss of the gas. Such formations are commonly referred to as aquifers. The term "aquifer" will hereafter be used to mean porous, mobile water-bearing subterranean oil-bearing reservoirs, or formations, containing mobile water.

Whole the storage of gas in subterranean porous earth formations represents a relatively low cost method of accommodating fluctuations in the supply and demand for the gas, it is usually difficult to locate suitable aquifers in a desired area. As is often the case, available formations are not sufficiently sealed to prevent the escape of gas from the storage area, or are of such extensive size as to render recovery of the injected gas difficult. A further difficulty encountered in the use of these natural occurring aquifers is that only a portion of the mobile water is displaced from the interstices of the formation because of the poor mobility ratio involved in displacing the water with injected gas.

Accordingly, it is an object of this invention to provide an improved method for storing gas in natural reservoirs beneath the earth's surface.

It is another object of this invention to increase the storage capacity of water-containing subterranean, porous rock formations for storing gas.

It is another object of this invention to increase the amount of natural gas that can be stored in an aquifer.

It is another object of this invention to increase the amount of interstitial water displaced from a gas storage formation by an injected gas.

It is another object of this invention to confine an injected gas within a limited zone of a gas storage formation.

It is a further object of this invention to provide a method for minimizing gas leakage from a gas storage reservoir.

Other objects and advantages of the invention will be apparent to those skilled in the art from the following description.

Briefly, the invention comprises a method of storing gas in a subterranean formation employing a viscous or carbonated aqueous foam-forming liquid to confine the injected gas within the formation and to improve the displacement of mobile water from the formation by the injected gas. The foam-forming liquid can be injected into the formation through gas injection wells in communication therewith or, alternatively, the liquid can be injected through a plurality of wells around the periphery of the gas storage zone. Also, the liquid can be injected at selected locations to control leakage of the injected gas through permeable strata. In one embodiment, the aqueous foam-forming liquid comprises a water solution of an agent that causes the water to foam upon intimate contact with gas, and a viscosity increasing amount of a thickening agent. This viscous foam-forming liquid can also be carbonated. In another embodiment, the aqueous foam-forming liquid containing an agent that causes the liquid to foam is carbonated.

Figure 2:
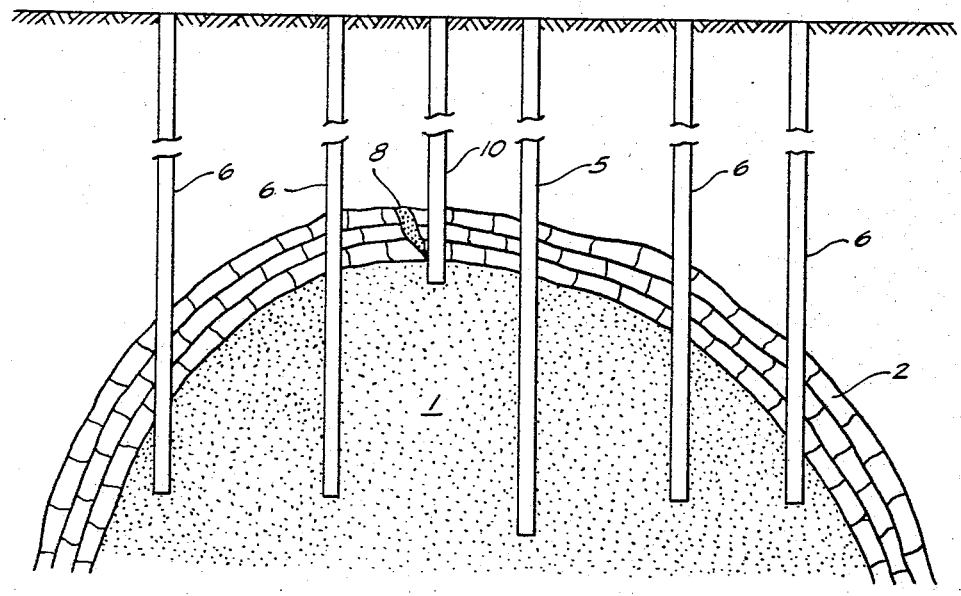

The invention will be more fully understood from the following detailed description and the accompanying drawings, in which FIGURE 1 is a plan view of the surface arrangement of a typical field showing the placement of wells to be used for the subterranean storage of gas; and FIGURE 2 is a vertical cross-section taken along an irregular plane determined by the line 2—2 of FIGURE 1.

I have discovered that the gas-storing capacity of aquifers and oil-bearing formations containing mobile water can be appreciably increased by initially injecting into the formation a viscous, aqueous slug containing an agent which causes the water to foam upon intimate contact with gas, and then immediately thereafter injecting the gas to be stored. By a viscous, aqueous slug is meant an aqueous slug to which a viscosity increasing agent has been added. Many thickening agents and viscosity increasing additives are known to those familiar in the art. Exemplary of these are molasses, polymerized ethylene oxide and polyacrylamide. An alternative method which will hereinafter be described utilizes a carbonated aqueous slug containing an agent which causes the water to foam upon intimate contact with gas and then immediately thereafter injecting the gas to be stored. Upon injection of the gas, a foam bank is created which creates sufficient resistance to the flow of gas to cause the gas to enter the small pores and passageways containing interstitial water, thereby forcing the water therefrom and creating additional space for storage of the gas. Furthermore, the foam forms a wall or envelope which contains the gas and prevents it from dissipating so far into the formation that thereafter it cannot be recovered through the withdrawal well. Alternatively, the foam-forming solution can be injected about the periphery of the storage zone so as to form a bank of gas-confining foam surrounding the storage zone. Also, in those cases in which a highly permeable streak, such as a fissure or fracture, exists in the cap rock which confines the formation, I have found that a foam can be formed to minimize the leakage of gas from the reservoir through the streak.

In the FIGURES 1 and 2, a substantially gas impermeable cap rock 2 overlies a permeable mobile water-containing subterranean formation 1 so as to form a dome shaped structure suitable for gas storage, the boundary 3 representing the outer limit of the gas storage zone. Formation 1 is penetrated by a well 5 suitable for the injection and withdrawal of the stored gas. Alternatively, a plurality of wells 5 can be used to obtain necessary injection and withdrawal gas flow capacity. In one mode of practicing the invention, a plurality of peripheral liquid injection wells 6 are spaced about the periphery of the formation 1 in communication therewith. Often a formation suitable for the storage of gas will be found in a depleted gas or petroleum reservoir having existing wells drilled into the structure, more or less in accordance with the illustrated pattern. In such cases, some or all of these existing wells can be utilized, usually in conjunction with supplemental wells drilled specifically for the gas storage operation.

In accordance with one mode of practicing my invention, one or more wells 5 are drilled to the depth of the formation in which the gas is to be stored. A viscous aqueous solution, either carbonated or non-carbonated, or a carbonated aqueous foam-forming solution, in the amount of approximately 0.001 to 0.2 pore volume of the aquifer or other mobile water-containing formation and containing approximately 0.001 to 10 weight percent of a foaming agent, and more particularly 0.001 to 1 weight percent of the agent, is introduced through the well or wells under sufficient pressure to force the solution into the aquifer. The pressure under which the solution is introduced will depend on the formation pressure, and it is only necessary that the pressure be sufficiently greater than the formation pressure to force the viscous, aqueous solution from the well into the formation.

After the injection of the viscous or carbonated aqueous solution containing the foam-producing agent is completed, injection of the gas to be stored is commenced and the gas is preferably injected through the same well or wells through which the viscous or carbonated aqueous solution is injected. Upon injection of the gas, foam is produced in the aquifer and because of the increased viscosity thereof, builds up resistance to passage of the gas into the formation. The injected gas thereupon flows through the smaller capillaries and into the small pores in which the foam has not entered and which contain interstitial water, thereby driving the water therefrom and creating additional storage space for the gas. Pressure under which the gas is injected must be sufficient to force the gas into the small capillaries and pores from which water has not been dislodged by the foam, but should not be so great as to disrupt the foam before it has served its purpose. Ordinarily, the injection pressure will be approximately 10 to 1000 lb./sq. inch above formation pressure.

As the foam bank is driven further and further into the aquifer and spreads out and diffuses, its effectiveness may gradually decrease, making it advantageous to inject a second slug of solution similar to the first slug, heretofore described, and then resuming injection of gas. This procedure may be repeated as often as it is desirable, as indicated by increase in pressure required to inject further quantities of gas into the formation.

Where the viscous or non-viscous foam-forming aqueous solution has been carbonated, $CO_2$ will come out of solution wherever a highly permeable streak exists, such as a fissure, fracture or other highly permeable area through which gas leaks rapidly because of the fact that the leak will have a continuously decreasing pressure gradient, thereby forming foam which will seal the area and inhibit or prevent escape of gas therethrough before the subsequently injected gas escapes. Where the highly permeable streak is in the cap rock, some of the $CO_2$ will escape and appear at the earth's surface, thereby giving early warning that gas leaks are present in the storage reservoir. As is well known, foam will not form unless an adequate amount of water is available in situ. However, by using carbonated water, the amount of formation or reservoir water required to form foam is reduced inasmuch as the $CO_2$ coming out of solution forms foam at very small water saturations.

When it is desired to recover gas from the formation in which it is stored, it can be withdrawn through the injection well or through other withdrawal wells which are drilled into the formation.

In another mode of practicing the invention, the viscous or carbonated aqueous foam-forming solution can be injected through the wells 6 spaced about the periphery of the gas storage formation so as to form a bank of gas-confining foam surrounding the storage zone. The foam bank is formed by the stored gas contacting the injected foam-forming liquid or, alternatively, in the case of carbonated foam-forming liquid, the foam bank is formed by the evolution of carbon dioxide from the carbonated liquid. Thus, in this mode of practicing the invention, viscous or carbonated aqueous liquid is injected through the peripheral wells 6, commencing prior to the initiation of gas injection through the well 5 and continuing through the gas injection step. Alternatively, the liquid injection can be delayed until after gas injection has been started and the gas has permeated a distance toward the boundary 3. Also, the foam-forming liquid can be injected intermittently during the gas injection step, rather than continuously. This mode of practicing the invention, wherein viscous or carbonated aqueous foam-forming liquid is injected at the periphery of the storage zone, has particular application where the gas is to be stored in a flat structure not having the well defined dome shape illustrated in FIGURE 2.

If the cap rock over the formation contains a highly permeable streak, such as a fissure, fracture or other highly permeable area, through which gas leaks rapidly, it may be desirable to drill one or more wells adjacent to said area and continually or intermittently to inject viscous or carbonated foam-forming solution therethrough in sufficient quantity to seal the area with foam and inhibit or prevent escape of gas therethrough. In general, such practice will minimize the amount of foam-forming solution which must be injected; amounts of solution as low as 0.001 pore volume will be effective in many applications of this aspect of the invention.

Accordingly, in another mode of practicing the invention, gas leakage from the storage formation through permeable zones of the cap rock can be reduced to tolerable levels by injecting viscous or aqueous foam-forming liquid into the permeable zone in the cap rock, or into the gas storage formation adjacent the permeable zone. Referring again to the FIGURES 3 and 4, cap rock 2 has a permeable streak 8 through which stored gas can escape from storage formation 1. An existing well 10, or a well drilled specifically for this purpose, penetrates the cap rock and terminates either in the permeable zone 8 or, as in the illustrated example, in the formation 1 immediately below the permeable zone 8. The viscous or aqueous foam-forming liquid is injected through the well 10 and, upon contact with the stored gas or upon evolution of the dissolved carbon dioxide, a bank of foam is formed in formation 1 adjacent the permeable zone 8 and in the zone 8 which restricts the flow of gas therethrough.

In injecting the aqueous foam-forming liquid according to the method of this invention, it is often advantageous to inject an initial portion of the liquid at a relatively high concentration of foam-forming agent, and to reduce the concentration in subsequently injected portions of the liquid. Accordingly, a first portion of the liquid can conveniently have a concentration of foam-forming agent of between about 1 and about 10 weight percent, and a subsequently injected portion of the fluid can have a concentration of between about 0.001 weight percent and about 1 weight percent.

As foam-producing agents, any one of a number of water-soluble surfactive agents which have foam-producing tendencies may be used. As examples of such foam-producing agents, there may be mentioned dimethyl didodecenyl ammonium chloride, methyl trioctenyl ammonium iodide, trimethyl decenyl ammonium chloride, dibutyl dihexadecenyl ammonium chloride; water-soluble salts of esters of $C_3$–$C_6$ sulfo dicarboxylic acids having the general formula

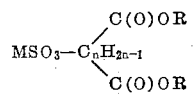

where M is a substituent forming a water-soluble salt, such as alkali metals, ammonium, and substituted ammonium, R is $C_3$–$C_{16}$ alkyl substituent, and *n* is an integer from 1–4, e.g., monosodium dioctyl sulfosuccinate, ammonium dilauryl sulfosuccinate, monosodium dibutyl sebacate, monosodium diamyl sulfoadipate; and others; and water-soluble perfluoroalkanoic acids and salts thereof having 3–24 carbon atoms per molecule, e.g., perfluoroctanoic acid, perfluoropropanoic acid, perfluorononanoic acid. Other surfactive agents which have the ability to produce foam under the conditions above set forth are:

| Trade Name | Chemical Name |
| --- | --- |
| Aerosol C-61 | Ethanolated alkyl guanidine-amine complex. |
| Aerosol OS | Isopropyl naphthalene sodium sulfonate. |
| Aerosol OT | Dioctyl sodium sulfosuccinate. |
| Arquad 2C | Dicoco dimethyl ammonium chloride. |
| Arquad T | Tallow trimethyl ammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT-60 | Condensation of hydrogenated tallow amide and ethylene oxide. |
| Hyonic FA-75 | Modified fatty alkylolamide. |
| Miranol HM Concentrate | Ethylene cyclomide 1-lauryl, 2-hydroxy ethylene Na alcoholate, methylene Na carboxylate. |
| Miranol MM Concentrate | Same as Miranol HM except myristyl group is substituted for lauryl group. |
| Nacconal NR | Alkyl aryl sulfonate. |
| Ninol AA62 | Lauric diethanolamide. |
| Nonol 1001 | Fatty acid alkanolamide. |
| Petrowet R | Sodium alkyl sulfonate. |
| Pluronic L44 | Condensation product of ethylene oxide with propylene glycol. |
| Product BCO | C-cetyl betaine. |
| Renex 650 | Polyoxyethylene alkyl aryl ether. |
| Sorbit AC | Sodium alkyl naphthalene sufonate. |
| Sulfanole FAF | Sodium salt of fatty alcohols, sulfated. |
| Triton AS-30 | Sodium lauryl sulfate. |
| Triton X-100 | Alkyl aryl polyether alcohol. |

A particularly preferred class of surface active agents useful in the practice of this invention are the anionic surfactants which can be described as those materials which, upon ionization, form a negatively charged surface active ion.

As thickening agents or viscosity increasers any one of a number of materials may be used so long as they are water dispersible. Exemplary of such agents are molasses, polymerized ethylene oxide, sugar, glycerine, natural and synthetic rubbers, particularly the rubberized polymers or isobutylene, co-polymers of butadiene and acrylonitrile, co-polymers of isobutylene, co-polymers of butadiene and styrene (Buna-S), polychloroproprene, polystyrene, polybutadiene, polymethylmethacrylate, polyvinylchloride, water-soluble polymers such as polyvinyl and polyallyl alcohols, polyacrylamide, hydroxyethylcellulose, hydroxymethylcellulose, aqueous solutions of certain synthetic polymers such as the co-polymers of methyl vinyl ether and maleic anhydride, polyacrylic acid, sodium polymethacylate, acrylamide-acrylic acid co-polymer, polyvinylpyridine, nitrocellulose, cellulose nitrate and polyvinyl pyrrolidone. Of the many thickening agents useful in the practice of this invention, a particularly preferred material is a partially hydrolyzed polyacrylamide wherein at least a portion of the substituent amide groups are hydrolyzed to carboxylic acid groups.

Sufficient amounts of the foregoing thickening agents should be employed to effect an increase in viscosity of the aqueous liquid, and preferably sufficient of the thickening agent should be employed to increase the viscosity of the liquid to approximately 5 to 100 centipoises at formation conditions.

As an example of the invention, an aquifer having a permeability of 1000 millidarcies and a porosity of 18%, and having a thickness of 100 ft. and an area of $10^6$ sq. ft., has a well drilled from the surface to near the bottom of the aquifer and the well is equipped with casing and control valves at the surface. There is injected through the well 0.1 pore volume of a brine solution which is saturated with $CO_2$ at superatmospheric pressures of about 800 p.s.i., in which is dissolved 0.1% by weight of Arquad 2C. The reservoir pressure is 200 lb./sq. in. and the carbonated brine solution is slugged in at a pressure of 800 lb./sq. in. A total of 480,000 barrels of brine solution is slugged into the formation. Upon completion of the injection of the brine solution the natural gas is injected through the same well under a pressure of 800 lb./sq. in.

Wherever the carbonated brine solution encounters a highly permeable streak, fissure, etc., $CO_2$ will come out of solution, thereby generating foam and thusly sealing any leak before any injected gas can escape.

As previously pointed out, the foam performs a dual function, namely, to increase the gas storage space within the aquifer or other water-bearing formation and to seal off the storage space by forming an envelope or wall around the storage area to confine the gas within a limited space and prevent loss of gas due to leakage through fissures and other flow paths. The more stable the foam, the more efficiently it will act as an envelope to contain the gas. The quantity of foaming agent used will depend on the size of the reservoir in which the gas is to be stored. Sufficient foaming agent should be used to maintain a foam wall sufficiently thick to prevent rupture at gas injection pressure. This may be accomplished by periodically injecting a new slug of carbonated brine to which the foaming agent has been added. As previously indicated, the efficiency of the foam is a function of its stability. Therefore, the previously enumerated viscosity increasing agents when used in conjunction with the aforedescribed process will tend to impart stability to the foam.

As a further example, an aquifer having a permeability of 1000 millidarcies and a porosity of 18%, and having a thickness of 100 ft. and an area of $10^6$ sq. ft., has a well drilled from the surface to near the bottom of the aquifer and the well is equipped with casing and control valves at the surface. There is injected through the well 0.1 pore volume of a viscous brine solution containing about 1% of sodium chloride obtained from the formation, in which is dissolved 0.4% by weight of polymerized ethylene oxide and 1% by weight Triton X-100. The reservoir pressure is 200 lb./sq. in. and the viscous brine solution is slugged in at a pressure of 800 lb./sq. in. A total of 480,000 barrels of viscous brine solution is slugged into the formation. Upon completion of the injection of the viscous brine solution the natural gas is injected through the same well under a pressure of 800 lb./sq. in. In lieu of the viscous brine solution containing a foaming agent, as disclosed in the foregoing example, a carbonated solution containing the foaming and water thickening agents may be substituted therefor, thereby generating a stable foam in the aquifer without the necessity of injecting natural gas.

When using carbonated water in the process in accordance with any of the foregoing examples, I prefer to saturate the water with $CO_2$ at approximately injection pressure. However, solutions containing less $CO_2$ than that required to saturate the solution at injection pressure or carbonated solutions saturated at pressures lower than injection pressure, may be used as long as sufficient $CO_2$ is present in the solution to be released at the point where sealing is desired.

Either fresh water or natural brines obtained from the earth may be used to prepare the viscous carbonated or non-carbonated foaming agent-containing solution, but where the formation contains clay it is preferable to use brine solutions in order to prevent undue swelling of the clay and plugging of the formation.

Further, while the method of this invention is directed primarily to the storage of natural gas, the invention is not so limited and can be employed generally in the storage of any relative non-reactive gas in a subterranean formation.

While particular embodiments of the invention have been described, it will be understood, of course, that the invention is not limited thereto since many modifications can be made and it is intended to include within the invention any such modifications as fall within the scope of the claims.

The invention having thus been described, I claim:

1. The method of storing gas in a permeable subterranean formation overlain by a substantially impervious rock cap, which comprises:
   injecting a slug of viscous aqueous solution into said formation through a well in communication therewith, said solution containing a major proportion of water, a viscosity increasing amount of a thickening agent and a minor amount of an agent which causes foaming upon contact with said gas;
   injecting said gas under pressure into said formation through a gas injection well;
   maintaining said gas in said formation under pressure for a desired period of time; and
   recovering gas from said formation.

2. The method defined in claim 1 wherein said viscous aqueous liquid is injected into said formation through said gas injection well subsequent to the injection of said gas.

3. The method defined in claim 1 wherein said aqueous liquid is injected through a plurality of wells situated about the periphery of said formation and wherein said gas is injected through one or more wells in communication with said formation within the area defined by said peripheral wells.

4. The method defined in claim 1 wherein said substantially impervious rock cap has a permeable zone through which gas can escape from the storage formation and wherein said gaseous liquid is injected through a well in communication with said formation adjacent said permeable zone.

5. The method defined in claim 1 wherein said viscous aqueous liquid contains sufficient of said thickening agent to increase the viscosity of the liquid to approximately 5 to 100 centipoises at formation conditions.

6. The method defined in claim 1 wherein said viscous aqueous liquid contains approximately .01 to 10 weight percent thickening agent and approximately 0.001 to 10 weight percent of said foaming agent.

7. The method defined in claim 1 wherein said gas is natural gas.

8. The method defined in claim 1 wherein said viscous aqueous solution is carbonated.

9. The method defined in claim 1 wherein said viscous aqueous solution is saturated with carbon dioxide at injection pressures.

10. The method defined in claim 1 wherein said thickening agent is a partially hydrolyzed polyacrylamide.

11. The method defined in claim 1 wherein said foam-forming agent is an anionic surfactant.

12. The method of storing gas in a permeable subterranean formation overlain by a substantially impervious rock cap, which comprises:
    injecting a slug of viscous aqueous solution into said formation through a well in communication therewith, said slug amounting to approximately 0.001 to 0.2 pore volume of the formation and containing approximately 0.01 to 10 percent of a thickening agent and 0.001 to 10 percent of an agent that causes foaming upon contact with said gas;
    injecting said gas through said well and into said formation under sufficient pressure to displace interstitial water therefrom;
    maintaining said gas in said formation under pressure for a desired period of time; and
    recovering gas from said formation.

13. The method defined in claim 12 wherein a first portion of said viscous liquid injected into said formation contains approximately 1 to 10 percent by weight of said foaming agent and wherein a second portion contains approximately 0.001 to 1 weight percent of said foaming agent.

14. The method defined in claim 12 wherein slugs of said viscous aqueous liquid and gas are alternatively injected into said formation.

15. The method defined in claim 12 wherein said viscous aqueous solution is carbonated.

16. The method defined in claim 12 wherein said viscous aqueous solution is saturated with carbon dioxide at injection pressure.

17. The method of storing gas in a permeable subterranean formation overlain by a substantially impervious rock cap, which comprises:
    injecting a viscous aqueous liquid into said formation through a plurality of wells situated about the periphery of said formation, said liquid containing approximately 0.01 to 10 percent of a thickening agent and 0.001 to 10 percent of an agent that causes foaming upon contact with said gas;
    injecting said gas under pressure through at least one gas injection well in communication with said formation within the peripheral area defined by said liquid injection wells;
    maintaining said gas in said formation under pressure for a desired period of time; and
    recovering said gas from said formation.

18. The method defined in claim 17 wherein said aqueous liquid is intermittently injected into said formation.

19. The method defined in claim 17 wherein said aqueous liquid is injected substantially continuously concomitantly with the injection of said gas.

20. The method defined in claim 17 wherein said viscous aqueous liquid is injected into said formation in sufficient amount to establish a bank of foam at the periphery of said formation upon being contacted by said gas.

21. The method defined in claim 17 wherein said viscous aqueous solution is carbonated.

22. The method defined in claim 17 wherein said viscous aqueous solution is saturated with carbon dioxide at injection pressure.

23. The method of controlling gas leakage through a permeable zone of an otherwise substantially impervious cap rock overlying a gas-containing formation which comprises injecting a viscous aqueous foam-forming solution containing a major proportion of water, approximately 0.01 to 10 weight percent of a thickening agent and 0.001 to 10 percent of an agent that causes foaming upon contact with said gas into said permeable zone of said cap rock in sufficient quantity to inhibit the escape of gas therethrough.

24. The method defined in claim 23 wherein said viscous aqueous foam-forming solution is injected through a well communicating with said formation adjacent said permeable zone of said cap rock.

25. The method defined in claim 23 wherein a first portion of said aqueous foam-forming liquid injected into said permeable zone contains a relatively high concentration of an agent which causes foaming on contact with said gas, and wherein subsequently injected portions of said liquid contain lesser concentrations of said foaming agent.

26. The method defined in claim 23 wherein said viscous aqueous liquid is carbonated.

27. The method defined in claim 23 wherein said viscous aqueous liquid is saturated with carbon dioxide at injection pressures.

28. The method of storing gas in a permeable subterranean formation overlain by a substantially impervious cap rock, which comprises:
    injecting a carbonated aqueous liquid into said formation through a well in communication therewith, said liquid containing a small amount of an agent that causes foaming upon contact with said gas;

injecting said gas under pressure into said formation through a gas injection well;

maintaining said gas in said formation under pressure for a desired period of time; and recovering gas from said formation.

29. The method defined in claim 28 wherein said aqueous liquid is saturated with carbon dioxide at injection pressure.

30. The method defined in claim 28 wherein said substantially impervious cap rock has a permeable zone through which gas can escape from the storage formation and wherein said carbonated aqueous liquid is injected into said permeable zone through a well in communication with said formation adjacent said permeable zone.

References Cited

UNITED STATES PATENTS

| | | | |
|---|---|---|---|
| 1,921,358 | 8/1933 | Hill et al. | 166—2 |
| 2,866,507 | 12/1958 | Bond et al. | 166—9 |
| 2,875,831 | 3/1959 | Martin et al. | 166—9 |
| 3,074,481 | 1/1963 | Habermann | 166—9 X |
| 3,141,503 | 7/1964 | Stein | 166—29 |
| 3,152,640 | 10/1964 | Marx | 166—42 X |
| 3,175,614 | 3/1965 | Wyllie | 166—42 |
| 3,177,939 | 4/1965 | Holm et al. | 166—9 |

CHARLES E. O'CONNELL, *Primary Examiner.*

STEPHEN J. NOVOSAD, *Examiner.*

UNITED STATES PATENT OFFICE
CERTIFICATE OF CORRECTION

Patent No. 3,330,352                        July 11, 1967

George G. Bernard

It is hereby certified that error appears in the above numbered patent requiring correction and that the said Letters Patent should read as corrected below.

Column 1, line 12, for "natural" read -- natural, --; line 33, for "Whole" read -- While --; line 41, for "natural" read -- naturally --; column 4, line 34, for "3 and 4" read -- 1 and 2 --; column 5, in the table, second column, line 24 thereof, for "sufonate" read -- sulfonate --; column 8, line 4, for "alternatively" read -- alternately --; line 27, for "defiined" read -- defined --.

Signed and sealed this 18th day of June 1968.

(SEAL)
Attest:

Edward M. Fletcher, Jr.                          EDWARD J. BRENNER
Attesting Officer                                Commissioner of Patents